United States Patent [19]

Weathers

[11] Patent Number: 4,690,367
[45] Date of Patent: Sep. 1, 1987

[54] WOOD-FORM SPLICE STAKE AND CARRIER

[76] Inventor: Beryl D. Weathers, Box 72, Holmesville, Nebr. 68374

[21] Appl. No.: 816,322

[22] Filed: Jan. 6, 1986

[51] Int. Cl.$^4$ .............................................. E01C 7/00
[52] U.S. Cl. ....................................... 249/6; 206/372; 206/493; 211/49.1
[58] Field of Search ........................................ 249/3–6, 249/7, 8, 208, 207; 52/102, 169.13, 721, 364; 206/442, 372, 481, 477, 493; 211/49 R

[56] References Cited

U.S. PATENT DOCUMENTS

| | | | |
|---|---|---|---|
| Re. 22,148 | 7/1942 | Lindner | 211/49.1 |
| 1,202,269 | 10/1916 | Cramer | 249/8 |
| 1,274,618 | 8/1918 | Smith | 249/3 |
| 1,309,068 | 7/1919 | Heltzel | 249/6 |
| 1,765,043 | 6/1930 | White | 211/49.1 |
| 1,858,644 | 5/1932 | Smith | 249/4 |
| 2,678,482 | 5/1954 | Cuthbertson et al. | 249/4 |
| 2,688,787 | 9/1954 | Lawler | 249/6 |
| 2,843,911 | 9/1958 | Maine | 249/6 |
| 2,917,803 | 12/1959 | Phillips | 249/7 |
| 3,561,721 | 2/1971 | Self | 249/9 |
| 4,512,466 | 4/1985 | Delang | 206/372 |
| 4,533,112 | 8/1985 | Santos | 249/3 |

Primary Examiner—Bernard Nozick
Attorney, Agent, or Firm—Zarley, McKee, Thomte Voorhees & Sease

[57] ABSTRACT

A wood-form splice stake includes an elongated stake member having a lower end adapted to be driven into the ground. A pair of flat flanges extend laterally outwardly in opposite directions from the upper end of the stake member for securement to respective adjacent ends of aligned concrete form boards for maintaining them in alignment and securing them against relative vertical movement. The stakes are preferably formed so as to be stackable in nested relation. A stake carrier includes an elongated base having an upstanding post insertable through aligned pull holes in the stacked stake members. The other ends of the stake members are confined between upstanding legs on the base plate to prevent pivotal movement about the post. A lock device is operatively associated with the post for releasably locking the stakes against removal from the post.

Metal-to-wood form adapters are provided for aligning and supporting wood form boards relative to conventional metal forms.

8 Claims, 8 Drawing Figures

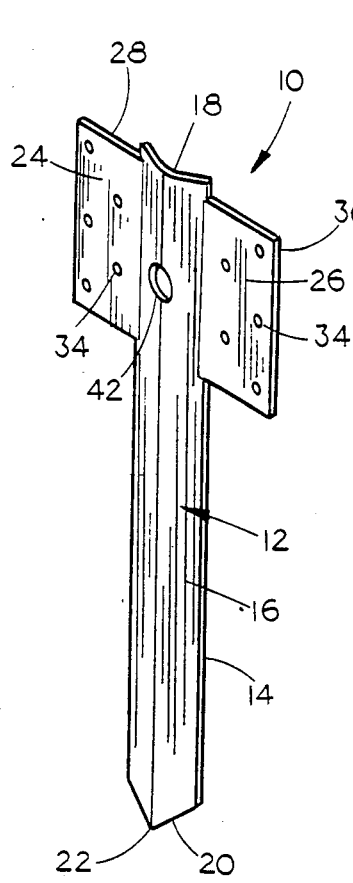
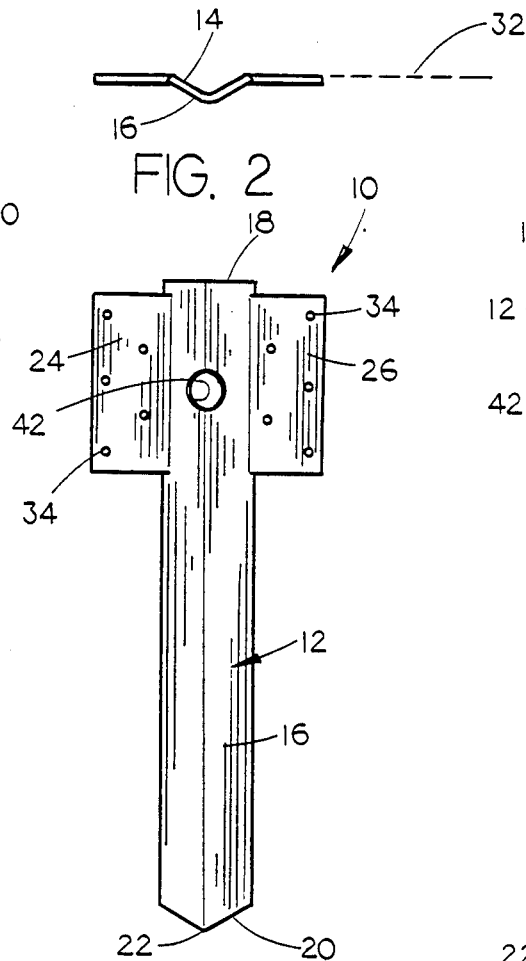
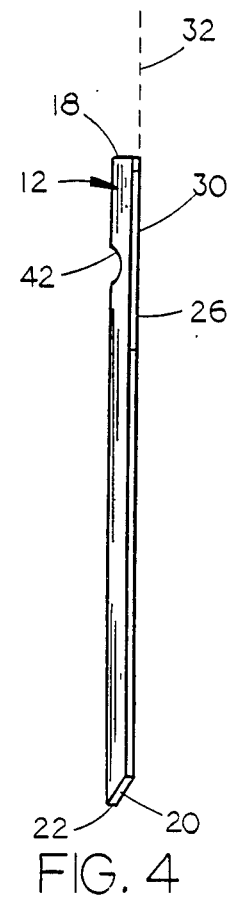
FIG. 1  FIG. 2  FIG. 3  FIG. 4
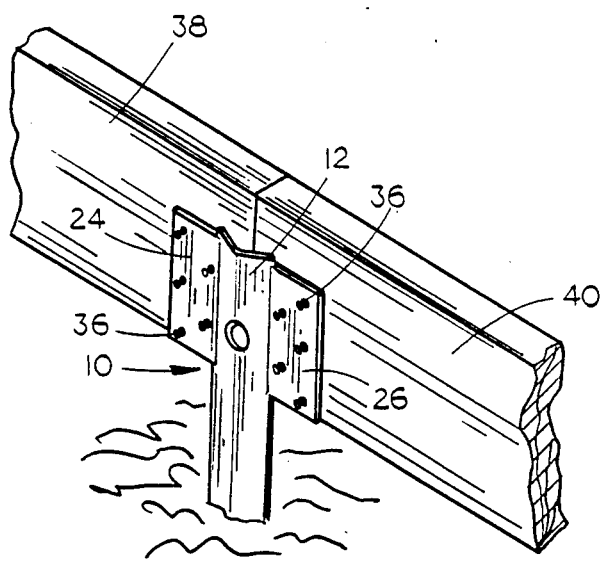
FIG. 5

WOOD-FORM SPLICE STAKE AND CARRIER

BACKGROUND OF THE INVENTION

The present invention is directed generally to an improved wood-form splice stake for concrete forms and to a carrier for a stack of such stakes. More specifically, the present invention is directed to an improved wood-form splice stake having a lower end adapted to be driven into the ground and an upper end provided with a pair of flanges extended outwardly therefrom in opposite directions for detachable connection to the adjacent ends of a pair of aligned wood-form boards for supporting the boards and maintaining them in alignment.

In the formation of large concrete surfaces such as for streets, driveways and the like, a side of the concrete surface is defined by a plurality of aligned wood-form boards. The most common support for the form boards is simply a 1×2 wooden stake which is driven into the ground and then nailed to the rear surface of the form board. Two or more such stakes are placed in spaced-apart positions between the ends of each form board. These wood stakes are generally used for one application and are then discarded afterwards whereas the form boards are reused. The prior art also includes metal stakes having a number of nail holes predrilled in them. These are used just like the wood stakes but are reusable.

The above-described prior stakes were not used at the joint between two forms. Accordingly, when a heavy vibrating screed is traversed along the form boards for smoothing the concrete, one form may tend to sink under the weight of the screed whereupon a ledge is formed blocking forward movement of the screed onto the next form board. Accordingly, there is a need for an improved wood-form splice stake which is operable both to support a wood-form board and to prevent relative vertical movement between a pair of adjacent wood-form boards.

Other somewhat complicated concrete form stakes have been proposed but these generally require some type of special fittings on the wood-form boards for receiving the stakes and accordingly are not usable with conventional plain wood-form boards.

Another problem associated with support stakes for concrete forms is the time and effort required for collecting and carrying them. Generally, a pile of stakes is simply thrown into the back of a truck. After travel across a construction site, the stakes are generally all over the truck. Since it is very time-consuming to count all of the stakes needed for a given job, stakes are often left behind unknowingly resulting in continuous replacement costs even for the metal stakes.

Accordingly, a primary object of the invention is to provide an improved wood-form splice stake.

Another object is to provide an improved wood-form splice stake having flanges outstretched in opposite directions for securement to the adjacent ends of aligned form boards for both supporting those form boards and maintaining them in alignment.

Another object is to provide an improved wood-form splice stake which engages the adjacent ends of a pair of form boards to prevent relative vertical movement between them.

Another object of the invention is to provide wood-form splice stakes which have a cross-sectional shape adapted for stacking the stakes in nested relation for compact storage and transport.

Another object is to provide a carrier for supporting and carrying a plurality of stacked stakes.

Another object is to provide a carrier designed to carry a predetermined number of stakes so that the operator knows the number of stakes in a full carrier without counting them.

Another object is to provide an improved wood-form splice stake and carrier which are simple and rugged in construction, inexpensive to manufacture and efficient in operation.

SUMMARY OF THE INVENTION

The wood-form splice stake of the present invention includes an elongated stake member having front and back sides, a lower end adapted to be driven into the ground and a pair of flat flanges extending laterally outwardly in opposite directions from the upper end of the stake member. The flanges have respective front surfaces lying in a common plane which is not intersected by the stake member so that the flanges may be detachably secured to respective adjacent ends of aligned forms. With the stake positioned at the joint between two forms and secured to both forms, relative vertical movement between the adjacent forms is prevented. Furthermore, a single stake according to the present invention replaces two conventional form stakes since a single stake supports the ends of two form boards.

A hole may be provided in the stake member for insertion of a tool for pulling the stakes from the ground. The stakes are preferably formed with a cross-sectional shape which accommodates stacking a group of stakes in nested relation. The pull holes present no projections which would interfere with stacking of the stakes.

The stake carrier of the present invention includes an elongated base having an upstanding post thereon for insertion through the pull holes of a stack of stakes for aligning the stakes and generally securing them against translational movement relative to the base. The base furthermore has a pair of upstanding walls between which the stake members are confined to preclude rotation of the stake members about the post. A lock device cooperates with the post for releasably locking the stakes against removal from the post and the lock device may be provided with a handle for convenient carrying of a stack of stakes. Preferably, a cross-member spans the upper ends of the first and second walls so that only a predetermined number of stacked stakes may be carried on the unit. An operator can thus simply quickly fill the carrier and know exactly how many stakes have been collected therein. This carrier furthermore prevents the stakes from becoming dispersed during transport.

There is also disclosed a metal-to-wood form adapter to accommodate the placement of conventional wood form boards as an extension for metal forms. The same problems exist as discussed above in connection with the wood-form splice stake, namely the alignment of the wood form board with the metal form and the prevention of relative vertical movement between the adjacent forms. The adapter of the present invention couples a flat flange adapted for securement to a wood-form board with either a male or female end fitting adapted for securement to the male or female end fitting of a metal form. Thus the metal-to-wood form adapter supports the wood-form board relative to the metal form and secures it against relative vertical movement.

BRIEF DESCRIPTION OF THE DRAWINGS

FIG. 1 is a perspective view of the wood-form splice stake of the invention;

FIG. 2 is a top view of the stake;

FIG. 3 is a front elevational view of the stake;

FIG. 4 is a side elevational view of the stake;

FIG. 5 is a diagrammatic perspective view of the stake in the ground and in use splicing two wood-form boards together;

DESCRIPTION OF THE PREFERRED EMBODIMENT

Figure 6:
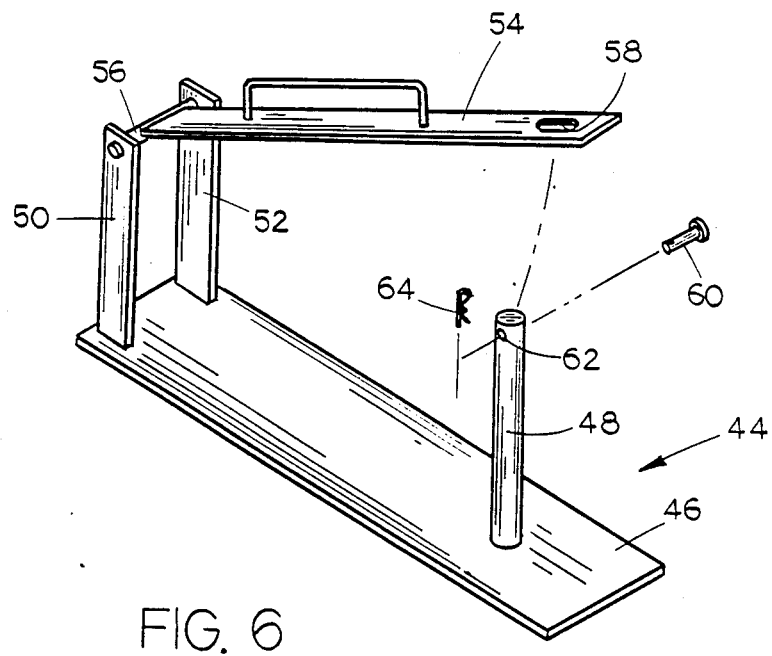
FIG. 6 is a partially exploded perspective view of the stake carrier of the invention.

The wood-form splice stake 10 of the present invention is shown in FIGS. 1-5 as including an elongated upright stake member 12 having front and back sides 14 and 16 and upper and lower ends 18 and 20. Lower end 20 may be pointed as at 22 to facilitate driving the lower end of the stake into the ground.

A pair of generally flat flanges 24 and 26 extend laterally outwardly in opposite directions from the stake member 12 adjacent the upper end 18 thereof. The flanges have respective front surfaces 28 and 30 which lie in a common plane, indicated by dotted line 32 in FIG. 4. Note that the stake member 12 is positioned in non-intersecting relation with respect to the common plane 32. The outer edges of the stake member 12 may contact the plane but do not protrude through it since the resulting forward projection would interfere with the placement of the stake against the surface of wood-form boards.

Each of the flanges 24 and 26 is provided with a plurality of nail holes 34 for detachably securing the flange to a wood-form board. FIG. 5 shows a plurality of double-headed nails 36 driven into form boards 38 and 40. The double-headed nails 36 facilitate removal of the nails upon disassembly of the form when the concrete has set.

Various other types of clamp fasteners and the like could be provided for detachably securing the flanges to form boards but the nail holes are preferred for simplicity, space efficiency and installation procedure resembling that of conventional form stakes.

A pull hole 42 is provided in stake member 12 adjacent the upper end thereof for the insertion of a tool for pulling the stakes from the ground. Whereas other types of hooks, brackets or the like could be provided for the same purpose, the pull hole is preferred since it presents no projections which would interfere with stacking of the stakes.

Figure 7:
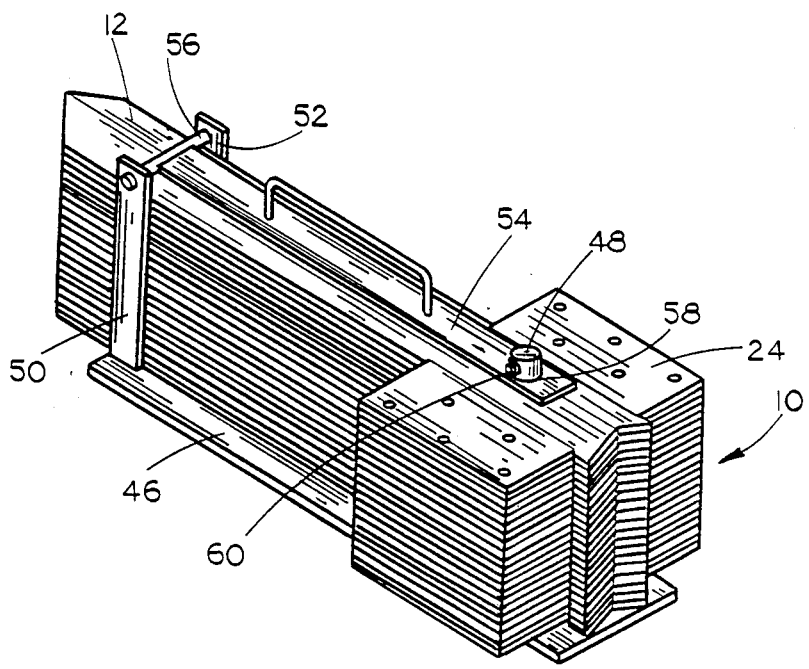
FIG. 7 is a perspective view of the carrier filled with stakes.

It can be seen in FIG. 2 that the cross-sectional shape of the stake is such that a number of stakes 10 can be stacked front surface to back surface in nested relation as illustrated in FIG. 7. In the preferred embodiment, the stake member 12 has a generally shallow V-shaped cross-sectional shape which imparts strength against bending and which is easily manufactured without imparting undue stress to the material of the stakes. The flanges 24, 26 may be either welded to the stake member 12 or integrally formed therewith from a single blank of sheet stock.

A carrier 44 for a stack of the wood-form splice stakes 10 of the invention is shown in FIGS. 6 and 7. The carrier includes a base plate 46 having an upstanding post 48 secured thereto and extending upwardly therefrom for insertion through the pull holes 42 of a stack stakes 10 for aligning the stakes and generally securing them in translational movement relative to the base plate 46.

A pair of upstanding first and second legs or wall members 50 and 52 extend upwardly from the base plate 46 at a position in spaced relation from post 48 for confining the stake members 12 between them to preclude rotation of the stake members about the post 48.

A lock device is associated with the post 48 for releasably locking the stakes against removal from the post. In the preferred embodiment, the lock device is provided as an elongated hold-down plate 54 having one end connected to a pivot shaft 56 extended between upper ends of the first and second wall members 50 and 52 for up and down pivotal movement of the opposite end thereof. The opposite end of the hold-down plate 54 has a post receiving hole 58 whereupon the hold-down plate may be pivoted downwardly onto a stack of stakes with the post extending through the hole 58 for receiving a fastener such as lock pin 60 through a transverse hole 62 and cotter key 64 for releasably preventing the raising of the hold-down plate from the post. The transverse hole 62 is preferably positioned approximately the same vertical height relative to the base plate 46 as is the pivot shaft 56. Accordingly, upon filling of the carrier with the maximum number of stakes which will fit below the pivot shaft, the hold-down plate can be pivoted downwardly to just clear the transverse hole 62 for insertion of the lock pin 60. The height of the carrier is preferably selected so that a predetermined even number of stakes may be carried therein. A preferred carrier has been designed with a capacity for twenty stakes.

The stakes may be provided in various lengths between 12" and 20", preferably in 2" increments. The carrier is designed in terms of the spacing between the wall members 50, 52 and post 48 so that the same carrier can accommodate stakes of any length. The carrier 44 can be quickly and easily filled, provided accountability for all stakes used on a job without counting the stakes one by one, and stores the stakes in compact relation for transport.

Figure 8:
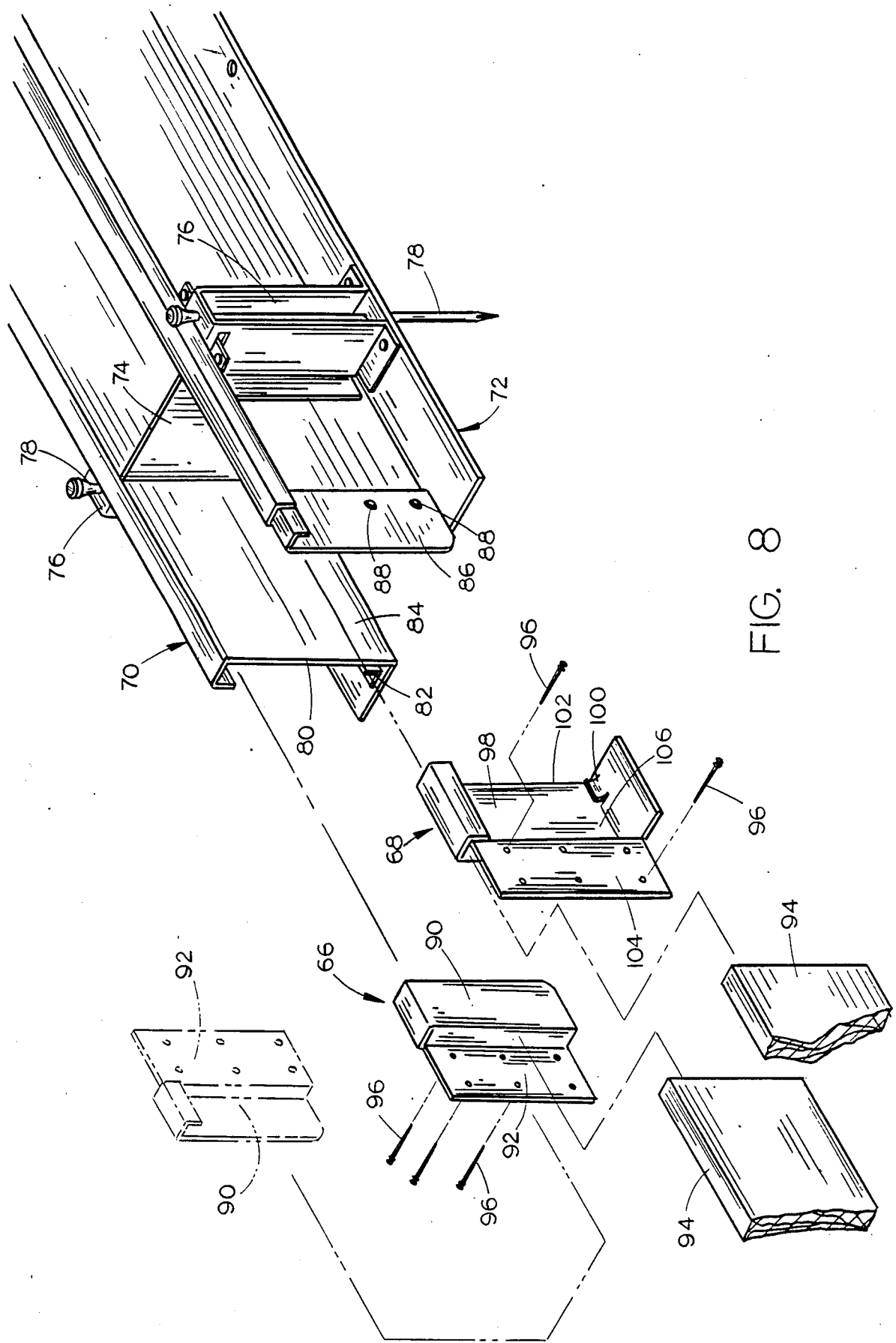
FIG. 8 is a perspective view of the male and female metal-to-wood form adapters.

FIG. 8 illustrates a couple of metal-to-wood form adapters 66 and 68 of the present invention. They are adapted for use in connection with conventional metal forms such as illustrated at the right-hand portion of FIG. 8. A pair of spaced-apart metal forms 70 and 72 are secured together by a spacer plate 74 and appropriate stake brackets 76 for forming a curb or the like. The metal forms are held in place on the ground by elongated spikes 78.

Form 70 terminates in a female end fitting 80 which simply comprises an open end of the generally C-shaped channel form 70 but with a shoulder bracket 82 positioned adjacent the upstanding web 84 to define a slot therebetween for receiving the male end fitting of another form.

Such a male end fitting 86 is shown in connection with form 72 as an inverted J-section plate secured by rivets 88 or the like to the form 72 and extended from one end thereof for receipt within the female end fitting 80 of another form.

Adapter 66 includes a male end fitting 90 adapted for insertion into the female end fitting 80 of form 70. End fitting 90 is coupled with a flat flange 92 extended longitudinally from one end thereof. The flange is so positioned in a fore and aft relation relative to the male end fitting 90 that a wood-form board 94 secured to the flanges by double-headed nails 96 will be aligned as an extension of the metal form 70. The double-headed nails 96 are easily removed for a detachable connection between the adapter 66 and a wood-form board 94.

Adapter 68 includes a female end fitting 98 in the form of a generally C-shaped channel section similar to form 72 but with an upturned shoulder 100 for defining a slot to receive the male end fitting 86. Upon placement of the fitting 98 over the male end fitting 86, fitting 98 serves as an extension of form 72. The male end fitting 86 is received within a first open end 102 of female end fitting 98.

A flange 104 extends longitudinally from the fitting 98 in parallel relation to the web 106 of fitting 98 and spaced in fore and aft relation relative thereto such that a wood-form board secured to the flange by double-headed nails 96 or the like will be positioned as an aligned extension of the female end fitting 98. Adapter 68 is preferably an integral stamping formed from a single blank of plate material.

Adapters 66 and 68 enable wood-form boards to be easily coupled to conventional metal forms with assurance that both are aligned together and supported against relative vertical movement between them.

Whereas the adapters have been illustrated in association with a particular type of metal form, it is apparent that similar adapters may be constructed with appropriate male and female end fittings for connection to any other type of metal forms.

Thus there has been shown and described an improved wood-form splice stake and carrier therefor which accomplishes at least all of the stated objects.

I claim:

1. A wood-form splice stake, comprising,
   an elongated stake member having front and back sides and upper and lower ends, said lower end being adapted to be driven into the ground,
   a pair of generally flat flanges rigidly mounted on said stake member adjacent the upper end thereof,
   said flanges extending laterally outwardly from said stake member in opposite directions,
   said flanges having respective front surfaces lying in a common plane, said stake member being positioned in nonintersecting relation with respect to said common plane,
   said stake member having a cross-sectional shape such that a plurality of stake members may be stacked front surface to back surface in nested relation, and
   means for detachably securing said flanges to respective adjacent ends of aligned forms for supporting said forms in aligned relation.

2. The stake of claim 1 wherein said means for detachably securing said flanges comprises a plurality of nail holes through each flange.

3. The stake of claim 1 wherein said stake member and flanges are integral portions of a unitary member.

4. The stake of claim 1 wherein said elongated stake member has a hole therethrough adjacent the upper end thereof for insertion of a stake removal tool.

5. A wood-form splice stake, comprising,
   an elongated stake member having front and back sides and upper and lower ends, said lower end being adapted to be driven into the ground,
   said stake member having a generally V-shaped cross section, such that a plurality of the stake members may be stacked front surface to back surface in nested relation,
   a pair of generally flat flanges rigidly mounted on said stake member adjacent the upper end thereof,
   said flanges extending laterally outwardly from said stake member in opposite directions,
   said flanges having respective front surfaces lying in a common plane, said stake member being positioned in non-intersecting relation with respect to said common plane, and
   means for detachably securing said flanges to respective adjacent ends of aligned forms for supporting said forms in aligned relation.

6. A carrier for a plurality of wood-form splice stakes, each stake including an elongated stake member having upper and lower ends, a pull hole adjacent the upper end and a pair of flanges rigidly secured to the stake portion adjacent the upper end thereof and extended laterally outwardly therefrom in opposite directions with means for securing the flanges to respective adjacent ends of aligned forms, said carrier comprising
   an elongated base,
   a post secured to the base and extended upwardly therefrom for insertion through the pull holes of a plurality of stacked stakes for aligning said stakes and generally securing them against translational movement relative to the base,
   a first upstanding wall member on said base at a position in spaced relation from said post,
   a second wall circumferentially spaced from said first wall relative to said post by a distance only slightly greater than the width of the stake members for confining the stake members between the first and second wall members, and
   an elongated hold-down plate having one end connected to said first and second wall members for pivotal movement about an axis extended therebetween, said hold-down plate having a hole positioned for receiving the upper end of said post upon pivotal movement of the plate downwardly onto stacked stake members on said base and fastener means securable to the upper end of the post for releasably preventing the raising of the hold-down plate therefrom.

7. The carrier of claim 6 wherein said hold-down plate includes an upstanding handle for carrying said carrier and any stakes supported thereon.

8. In combination with a plurality of wood-form splice stakes, each stake including an elongated stake member having upper and lower ends, a pull hole adjacent the upper end and a pair of flanges rigidly secured to the stake portion adjacent the upper end thereof and extended laterally outwardly therefrom in opposite directions with means for securing the flanges to respective adjacent ends of aligned forms, a carrier for said stakes comprising,
   an elongated base,
   a post secured to the base and extended upwardly therefrom for insertion through the pull holes of a plurality of stacked stakes for aligning said stakes and generally securing them against translational movement relative to the base, a first upstanding wall member on said base at a position in spaced relation from said post, a second wall circumferentially spaced from said first wall relative to said post by a distance only slightly greater than the width of the stake members for confining the stake members between the first and second wall members, and an elongated hold-down plate having one end connected to said first and second wall members for pivotal movement about an axis extended therebetween, said hold-down plate having a hole positioned for receiving the upper end of said post upon pivotal movement of the plate downwardly onto stacked stake members on said base and fastener means securable to the upper end of the post for releasably preventing the raising of the hold-down plate therefrom.

* * * * *